US009478232B2

(12) United States Patent
Hirohata et al.

(10) Patent No.: US 9,478,232 B2
(45) Date of Patent: Oct. 25, 2016

(54) SIGNAL PROCESSING APPARATUS, SIGNAL PROCESSING METHOD AND COMPUTER PROGRAM PRODUCT FOR SEPARATING ACOUSTIC SIGNALS

(71) Applicant: Kabushiki Kaisha Toshiba, Minato-ku (JP)

(72) Inventors: Makoto Hirohata, Kanagawa (JP); Masashi Nishiyama, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 254 days.

(21) Appl. No.: 14/058,829

(22) Filed: Oct. 21, 2013

(65) Prior Publication Data

US 2014/0122068 A1    May 1, 2014

(30) Foreign Application Priority Data

Oct. 31, 2012    (JP) .................................. 2012-240669

(51) Int. Cl.
*G10L 15/20*    (2006.01)
*G10L 21/0272*    (2013.01)
(Continued)

(52) U.S. Cl.
CPC .......... *G10L 21/0272* (2013.01); *G10L 15/20* (2013.01); *G10L 15/02* (2013.01); *G10L 21/0208* (2013.01)

(58) Field of Classification Search
CPC ....................... G10L 21/0272; G10L 21/0208
See application file for complete search history.

(56) References Cited

U.S. PATENT DOCUMENTS 4,628,529 A * 12/1986 Borth .................. G10L 21/0208
381/317
5,550,924 A * 8/1996 Helf .................... G10L 21/0208
381/94.3

6,920,424 B2 * 7/2005 Padmanabhan ......... G10L 15/02
704/207
(Continued)

FOREIGN PATENT DOCUMENTS

JP    2009-128906    6/2009

OTHER PUBLICATIONS

Schuller, Björn, et al. "Non-negative matrix factorization as noise-robust feature extractor for speech recognition." Acoustics Speech and Signal Processing (ICASSP), 2010 IEEE International Conference on. IEEE, 2010.*

(Continued)

*Primary Examiner* — Jialong He
(74) *Attorney, Agent, or Firm* — Oblon, McClelland, Maier & Neustadt, L.L.P.

(57) ABSTRACT

According to an embodiment, a signal processing apparatus includes an ambient sound estimating unit, a representative component estimating unit, a voice estimating unit, and a filter generating unit. The ambient sound estimating unit is configured to estimate, from the feature, an ambient sound component that is non-stationary among ambient sound components having a feature. The representative component estimating unit is configured to estimate a representative component representing ambient sound components estimated from one or more features for a time period, based on a largest value among the ambient sound components within the time period. The voice estimating unit is configured to estimate, from the feature, a voice component having the feature. The filter generating unit is configured to generate a filter for extracting a voice component and an ambient sound component from the feature, based on the voice component and the representative component.

11 Claims, 13 Drawing Sheets

(51) Int. Cl.
  *G10L 21/0208* (2013.01)
  *G10L 15/02* (2006.01)

(56) References Cited

U.S. PATENT DOCUMENTS

| | | | | |
|---|---|---|---|---|
| 7,415,392 | B2* | 8/2008 | Smaragdis | G10L 21/0272 375/240.12 |
| 7,492,814 | B1* | 2/2009 | Nelson | G10L 21/0208 375/224 |
| 8,015,003 | B2* | 9/2011 | Wilson | G10L 21/0208 704/226 |
| 8,489,396 | B2* | 7/2013 | Hetherington | G10L 21/02 704/226 |
| 2002/0128830 | A1* | 9/2002 | Kanazawa | G10L 21/0208 704/226 |
| 2005/0222840 | A1* | 10/2005 | Smaragdis | G10L 21/0272 704/204 |
| 2007/0021958 | A1* | 1/2007 | Visser | G10L 21/0272 704/226 |
| 2008/0089531 | A1* | 4/2008 | Koga | H04R 3/005 381/92 |
| 2009/0080666 | A1* | 3/2009 | Uhle | H04R 5/04 381/17 |
| 2009/0234901 | A1* | 9/2009 | Cichocki | G06K 9/624 708/320 |
| 2009/0248411 | A1* | 10/2009 | Konchitsky | G10L 15/20 704/242 |
| 2010/0017206 | A1* | 1/2010 | Kim | G10L 21/0272 704/233 |
| 2010/0082339 | A1* | 4/2010 | Konchitsky | G10L 21/0208 704/226 |
| 2010/0232619 | A1* | 9/2010 | Uhle | G10L 21/0364 381/80 |
| 2010/0254539 | A1* | 10/2010 | Jeong | G10L 21/0272 381/56 |
| 2011/0064242 | A1* | 3/2011 | Parikh | G10L 21/0272 381/94.2 |
| 2012/0185246 | A1* | 7/2012 | Zhang | G10L 21/0208 704/226 |
| 2013/0035933 | A1 | 2/2013 | Hirohata | |
| 2013/0218570 | A1 | 8/2013 | Imoto et al. | |

OTHER PUBLICATIONS

Cichocki, Andrzej, Rafal Zdunek, and Shun-ichi Amari. "New algorithms for non-negative matrix factorization in applications to blind source separation." Acoustics, Speech and Signal Processing, 2006. ICASSP 2006 Proceedings. 2006 IEEE International Conference on. vol. 5. IEEE, 2006.*

Schmidt, Mikkel N., Jan Larsen, and Fu-Tien Hsiao. "Wind noise reduction using non-negative sparse coding." Machine Learning for Signal Processing, 2007 IEEE Workshop on. IEEE, 2007.*

Raj, Bhiksha, et al. "Non-negative matrix factorization based compensation of music for automatic speech recognition." Interspeech. 2010.*

Steven F. Boll, "Suppression of Acoustic Noise in Speech Using Spectral Subtraction", IEEE Transactions on Acoustics, Speech, and Signal Processing, vol. ASSP-27, No. 2, Apr. 1979, 8 pages.

Eric Scheirer, et al., "Construction and Evaluation of a Robust Multifeature Speech/Music Discriminator", Proc. ICASSP-97, Apr. 21-24, Munich, Germany, 4 pages.

Yukihiro Nomura, et al., "Musical Noise Reduction by Spectral Subtraction Using Morphological Process" (with English Abstract), The Institute of Electronics, Information and Communication Engineers Transactions (Japanese Edition), Information and Systems, vol. J89-D, No. 5, 2006, 11 pages.

"Perceptual evaluation of speech quality (PESQ): an objective method for end-to-end speech quality assessment of narrow-band telephone networks and speech codecs", ITU-T Recommendation P.862, Feb. 2001, 28 pages.

* cited by examiner

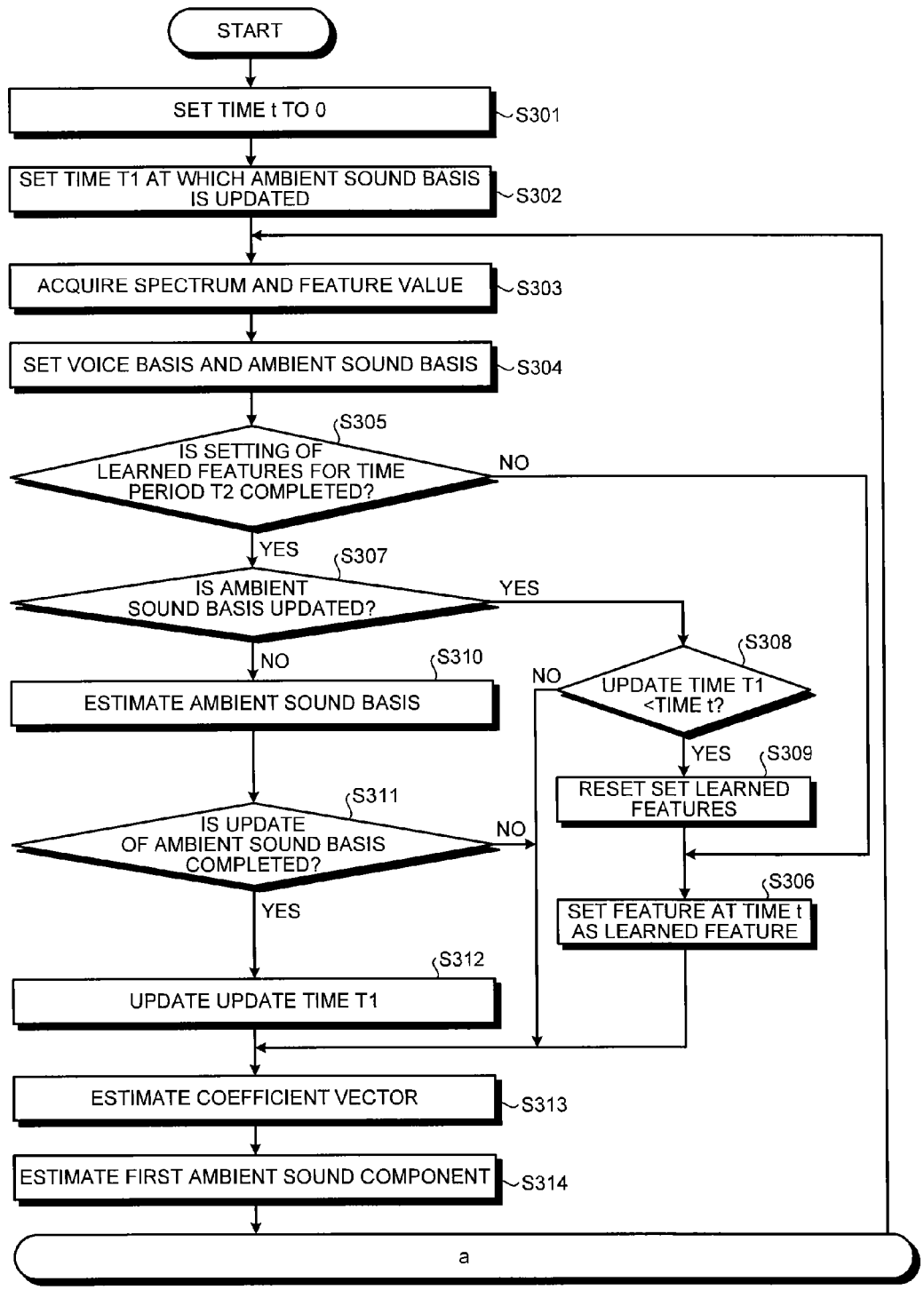

|  | NUMBER OF SOURCES | DETAILS OF SOURCES |  |
|---|---|---|---|
| VOICE | 4 | FILM<br>ANIMATION<br>NEWS | 2<br>1<br>1 |
| AMBIENT SOUND | 20 | CLASSICAL MUSIC<br>INSTRUMENTAL<br>SOUNDTRACK<br>CHEER | 5<br>5<br>5<br>5 |

SIGNAL PROCESSING APPARATUS, SIGNAL PROCESSING METHOD AND COMPUTER PROGRAM PRODUCT FOR SEPARATING ACOUSTIC SIGNALS

CROSS-REFERENCE TO RELATED APPLICATION

This application is based upon and claims the benefit of priority from Japanese Patent Application No. 2012-240669, filed on Oct. 31, 2012; the entire contents of which are incorporated herein by reference.

FIELD

Embodiments described herein relate generally to a signal processing apparatus, a signal processing method, and a computer program product.

BACKGROUND

Acoustic signals picked up by microphones in speech recognition, video production, or the like also include ambient sound signals such as background noise and music in addition to voice signals of voice of users or actors. There are source separation technologies as technologies for extracting only desired signals from acoustic signals in which voice signals and ambient sound signals are mixed.

For example, a source separation technology using non-negative matrix factorization (NMF) is known. The NMF is a technique of decomposing a plurality of spectra into a product of a basis matrix and a coefficient matrix. If a basis matrix of ambient sound is generated in advance by using training samples, a high-variance, non-stationary ambient sound spectrum can be estimated by adjusting a coefficient matrix according to the spectrum of an acoustic signal to be processed. A voice spectrum can also be estimated similarly to the ambient sound spectrum, and ambient sound signals and voice signals can be extracted.

In order to perform source separation with high accuracy on mixtures of various ambient sounds and scene changes, it is desirable to use acoustic signals previously picked up as training samples. On the other hand, in order to realize source separation at a low computational cost, such as to minimize delays, it is desirable to estimate ambient sound by using few samples smaller than several seconds, for example.

With the technologies of the conventional system, however, spectral distribution of ambient noise cannot be estimated with high accuracy by using a small number of samples. That is, there have been disadvantages that the accuracy of estimation of average components of ambient sound is lowered (estimated ambient sound components are insufficient) and that much ambient sound remains in extracted voice (separation performance is lowered).

BRIEF DESCRIPTION OF THE DRAWINGS

FIGS. 3A and 3B illustrate a flowchart of signal processing in the first embodiment;

DETAILED DESCRIPTION

Figure 1:
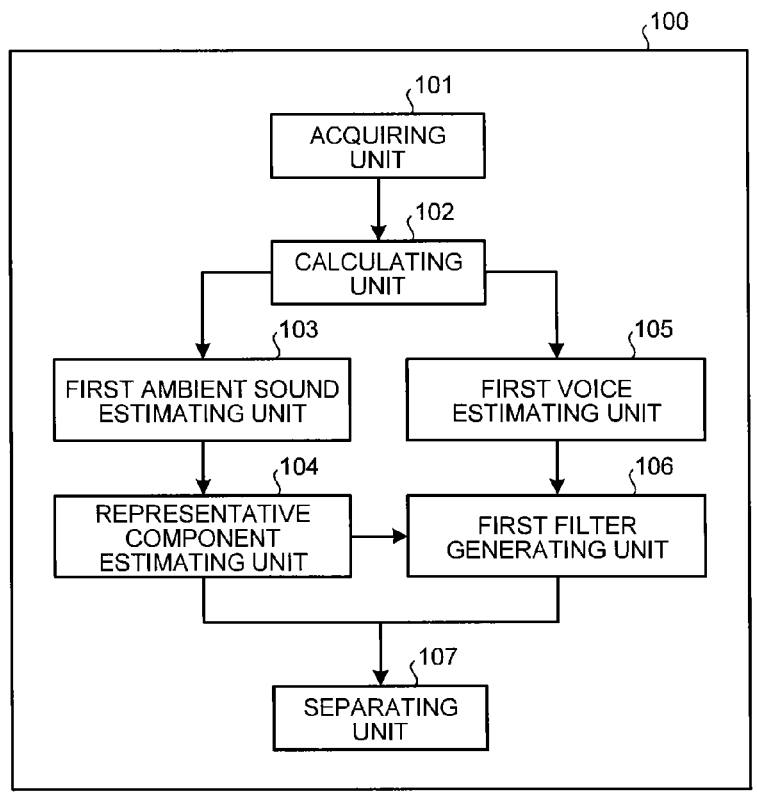
FIG. 1 is a block diagram illustrating a signal processing apparatus according to a first embodiment.

According to an embodiment, a signal processing apparatus includes an acquiring unit, a first ambient sound estimating unit, a representative component estimating unit, a first voice estimating unit, a first filter generating unit, and a separating unit. The acquiring unit is configured to acquire a feature of an acoustic signal by analyzing a frequency of the acoustic signal. The first ambient sound estimating unit is configured to estimate, from the feature, a first ambient sound component that is non-stationary among ambient sound components having the feature. The representative component estimating unit is configured to estimate a representative component representing first ambient sound components estimated from one or more features for a time period on the basis of a largest value among the first ambient sound components within the time period. The first voice estimating unit is configured to estimate, from the feature, a first voice component that is a voice component having the feature. The first filter generating unit is configured to generate a first filter for extracting a voice component and an ambient sound component from the feature on the basis of the first voice component and the representative component. The separating unit is configured to separate the acoustic signal into a voice signal and an ambient sound signal by using the first filter.

Preferred embodiments of a signal processing apparatus according to the invention will be described in detail below with reference to the accompanying drawings.

First Embodiment

A signal processing apparatus according to a first embodiment separates an acoustic signal containing a voice signal and an ambient sound signal into the voice signal and the ambient sound signal. For example, the signal processing apparatus according to the present embodiment can be used for preprocessing in speech recognition so as to improve the recognition performance of speech recognition. Furthermore, the mixing ratio of the extracted voice signal and ambient sound signal can be changed before watching and listening to video so as to make a desired signal easier to listen to.

The signal processing apparatus according to the present embodiment estimates a first ambient sound component that is non-stationary by using a feature acquired from an acoustic signal. For estimating a first ambient sound component, an ambient sound basis matrix estimated using few features acquired within a previous time period is used. A representative component representing first ambient sound components within a time period is estimated by using first ambient sound components estimated within a certain period of time in addition to the estimated first ambient sound component. Furthermore, a first voice component is estimated by using an acquired feature. A first filter for extracting a voice or ambient sound spectrum is generated by using the estimated first voice component and representative component. The acoustic signal is separated into a voice signal and an ambient sound signal by using the generated first filter and the acoustic signal spectrum.

In this manner, the signal processing apparatus according to the present embodiment performs separation on the basis of a representative component estimated by using first ambient sound components estimated in the past. As a result, it is possible to improve the problem that an ambient sound spectrum remains in a voice spectrum.

FIG. 1 is a block diagram illustrating an exemplary configuration of a signal processing apparatus 100 according to the first embodiment. The signal processing apparatus 100 includes an acquiring unit 101, a calculating unit 102, a first ambient sound estimating unit 103, a representative component estimating unit 104, a first voice estimating unit 105, a first filter generating unit 106, and a separating unit 107.

The acquiring unit 101 analyzes the frequency of an acoustic signal containing a voice signal and an ambient sound signal, and acquires features of the acoustic signal. Note that the acquiring unit 101 may be configured to acquire features obtained at an external device by frequency analysis or the like.

The calculating unit 102 calculates an ambient sound basis matrix expressing ambient sound by using features acquired within a time period.

The first ambient sound estimating unit 103 estimates a first ambient sound component that is non-stationary among ambient sound component corresponding to the acquired features by using the features and the calculated ambient sound basis matrix.

The representative component estimating unit 104 estimates a representative component of the first ambient sound components within the time period from the first ambient sound components estimated using one or more features acquired within the time period including the past time.

The first voice estimating unit 105 estimates first voice components that are voice components corresponding to the acquired features by using the features.

The first filter generating unit 106 generates a first filter for extracting a voice spectrum or an ambient sound spectrum from the estimated first voice components and the estimated representative component of the first ambient sound components.

The separating unit 107 separates the acoustic signal into the voice signal and the ambient sound signal by using the first filter and the acoustic signal spectrum.

Figure 2:
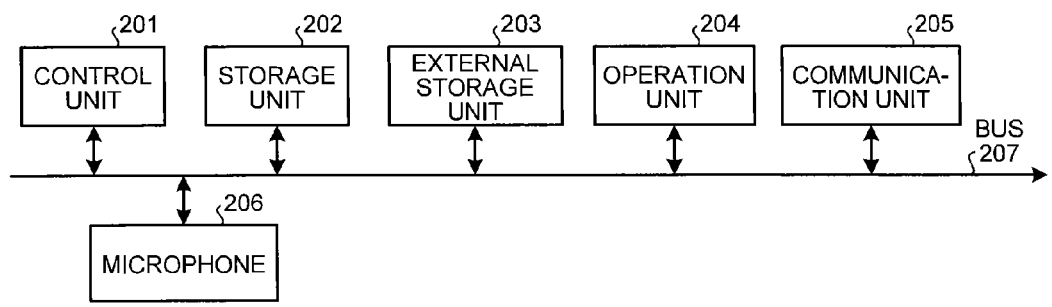
FIG. 2 is a hardware configuration diagram of the signal processing apparatus.

Next, a hardware configuration of the signal processing apparatus 100 will be described. FIG. 2 is an explanatory diagram illustrating an exemplary hardware configuration of the signal processing apparatus 100.

The signal processing apparatus 100 includes hardware utilizing a common computer system as illustrated in FIG. 2. The signal processing apparatus 100 has a configuration in which a control unit 201, a storage unit 202, an external storage unit 203, an operation unit 204, a communication unit 205, and a microphone 206 are connected via a bus 207.

The control unit 201 is a central processing unit (CPU) or the like configured to control the entire device. The storage unit 202 is a read only memory (ROM), a random access memory (RAM) or the like configured to store various data and various programs. The external storage unit 203 is a storage unit such as a hard disk drive (HDD), a compact disc (CD) drive or the like configured to store various data and various programs. The operation unit 204 is a keyboard, a mouse or the like configured to receive instructions input by a user. The communication unit 205 is configured to control communication with external devices. The microphone 206 is configured to pick up voice such as utterance of a user.

The functions of the respective components illustrated in FIG. 1 are implemented by executing various programs stored in the storage unit 202 such as a ROM and the external storage unit 203 by the control unit 201, for example, in such a hardware configuration. Thus, the respective components may be implemented by making a processor such as a CPU execute programs, that is, by software, may be implemented by hardware such as an integrated circuit (IC), or may be implemented by combination of software and hardware, for example. Details of the functions of the components will further be described below.

The acquiring unit 101 acquires an acoustic signal input to the microphone 206. The acoustic signal contains an ambient sound signal such as background noise and music in addition to a voice signal representing human voice. The acoustic signal is a digital signal sampled at 48 kHz, for example. Note that the acquiring unit 101 may acquire an acoustic signal from the external storage unit 203 or an external storage device connected via the communication unit 205 instead of the microphone 206.

The acquiring unit 101 also analyzes the frequency of the acquired acoustic signal to obtain a feature (vector) of the frequency. Specifically, the acquiring unit 101 divides the acoustic signal into frames of 2048 samples in length at intervals of 1024 samples. The acquiring unit 101 performs the division into frames by using a Hanning window or a Hamming window. Subsequently, the acquiring unit 101 acquires a feature $Z_t$ of the frequency from a frame at each time t. As the feature $Z_t$, a cepstral feature such as an LPC cepstrum and MFCC can be used in addition to a spectrum $X_t$ obtained by performing Fourier transform on each frame of the acoustic signal. Alternatively, a feature integrating a plurality of features calculated according to different methods can be used.

The calculating unit 102 estimates a basis matrix (ambient sound basis matrix H2) expressing ambient sound from the features of a plurality of previous frames acquired by the acquiring unit 101 by using the NMF, for example. The calculating unit 102 obtains a basis matrix H3 by integrating (connecting) a basis matrix (voice basis matrix H1) expressing voice and the ambient sound basis matrix H2. As will be described later, the voice basis matrix H1 is obtained in advance and stored in the storage unit 202 or the external storage unit 203. The calculating unit 102 obtains a coefficient vector $U_t$ so that the product of the basis matrix H3 and the coefficient vector $U_t$ is an approximation of the feature of a current frame.

When a feature of each frame is a D-dimensional vector, the voice basis matrix H1 is a matrix of D rows and M columns, the ambient sound basis matrix H2 is a matrix of D rows and N columns, and the coefficient vector Ut is an (M+N)-dimensional vector.

The first ambient sound estimating unit 103 extracts elements of the coefficient vector Ut for the ambient sound basis matrix H2. In the example described above, the elements of the coefficient vector Ut for the ambient sound basis matrix H2 are N elements from (M+1)-dimensional to N-dimensional elements among the elements of the (M+N)-dimensional coefficient vector Ut. That is, the coefficient vector (hereinafter referred to as a coefficient vector Ubt) for the ambient sound basis matrix H2 is an N-dimensional vector. The first ambient sound estimating unit 103 obtains a vector B1$t$ expressed by the product of the ambient sound basis matrix H2 and the extracted coefficient vector Ubt as a first ambient sound component.

D is equal to the number of dimensions of the acquired feature. Since a feature integrating a plurality of features of a plurality of frequency may be used, D can be an arbitrary number (32, for example). Furthermore, M and N can be set to arbitrary numbers such as 32 and 64, and may be different values or the same value.

The voice basis matrix H1 can be obtained as follows, for example. First, a plurality of features acquired from an acoustic signal of a voice separately provided is approximated by the product of a basis matrix H and a coefficient matrix U. The derivation of the basis matrix H and the coefficient matrix U is performed by an iterative method using a square error of the product of the basis matrix H and the coefficient matrix U and a matrix Z constituted by a plurality of features as reference.

In this case, random values can be used for initial matrices of the basis matrix H and the coefficient matrix U. Subsequently, postprocessing such as normalization is performed on the derived basis matrix H, and the resulting basis matrix H is stored as the voice basis matrix H1 in the storage unit 202 or the external storage unit 203. For derivation of the coefficient vector Ut, the iterative method performed for obtaining the voice basis matrix H1 may be applied in a state in which the basis matrix H3 is fixed.

The calculating unit 102 uses the features of previous frames for a time period T2 for estimation of the ambient sound basis matrix H2 when the time t of the current frame has passed update time T1. Note that the update time T1 may be set at intervals of a time period T3. Alternatively, the update time T1 may be set to time at which a change in the type of sound such as noise-superimposed sound or music-superimposed sound or in the scene (refer, for example, to E. Scheirer et al., "Construction and Evaluation of a Robust Multi-Feature Speech/Music Discriminator", ICASSP 1997).

In order to avoid redundant processing, it is desirable that the interval between the update time T1 and previous update time T1' be a time period T4 (1 second, for example) or longer. Furthermore, the time period T2 can be an arbitrary time period as long as T2<T1−T1' is satisfied in relation to the update time T1 and the previous update time T1'. For example, the time period T3 may be set to 5 seconds and the time period T2 may be set to 0.3 seconds.

When the iterative method is used for estimation of the ambient sound basis matrix H2, the calculating unit 102 can apply the iteration method not only to processing of a frame at time t (>T1) but also at time (t+1) to time (t+k) to update the ambient sound basis matrix H2. In this process, the calculating unit 102 replaces the ambient sound basis matrix H of each frame used so far with the ambient sound basis matrix H2 obtained after processing at time (t+k). As a result, it is possible to distribute the computational cost necessary for updating the ambient sound basis matrix H2. When the number of times the iterative method performed at each time is applied is r (1, for example), the number of times R the iterative method is applied until the update of the ambient sound basis matrix H2 is completed is r×k. When the difference between time (t+1) and time (t+k) is the time period T4 or longer, the value of a variable k that is an update interval can be set to an arbitrary value such as 10.

The representative component estimating unit 104 estimates a representative component A1$t$ by using previous first ambient sound components B1($t$−1), B1($t$−2), . . . , B1($ts$) estimated by the first ambient sound estimating unit 103 and the current first ambient sound component B1$t$. Elements constituting the representative component A1$t$ are estimated individually. For example, the representative component estimating unit 104 obtains a largest value among relevant elements of the first ambient sound components within a time period including the past and the current time as a corresponding element of the representative component A1$t$. The previous first ambient sound components to be used are those estimated at time at which a new ambient sound basis matrix H2 is set by the calculating unit 102. The time is time at which update of the ambient sound basis matrix H2 is completed and the ambient sound basis matrix H2 is replaced.

With the method of the conventional system, a filter used for source separation is generated by using the current first ambient sound component B$it$, for example. With such a method, the ambient sound component B1$t$ may be insufficient relative to the actual input ambient sound because of the influence of the ambient sound basis estimated from short-term samples, resulting in that the ambient sound component cannot be properly removed.

In contrast, in the present embodiment, the representative component is estimated by using the largest value among the first ambient sound components estimated at previous times as described above. Then, a filter is generated by also using the representative component and source separation is performed by using the filter (details of which will be described later). Accordingly, even when the first ambient sound component is insufficient relative to the actual input ambient sound because of few samples, it is possible to compensate for the insufficiency and properly remove the ambient sound component.

Note that the method for calculating the representative component is not that of obtaining a largest value. The representative component may be any value that can compensate for the insufficiency of the first ambient sound component and that is calculated on the basis of a largest value. For example, a value obtained by multiplying the largest value by a predetermining coefficient may be used as the representative component.

The first voice estimating unit 105 extracts elements of a coefficient vector for the voice basis matrix H1 from the coefficient vector Ut obtained by the first ambient sound estimating unit 103. The first voice estimating unit 105 obtains a vector V1$t$ expressed by the product of the voice basis matrix H1 and the extracted coefficient vector Uvt as a first voice component.

The first filter generating unit 106 generates a filter (first filter) for extracting a voice spectrum Vt or an ambient sound spectrum Bt by using the first voice component V1$t$ and the representative component A1$t$. First, the first filter generating unit 106 converts the first voice component V1$t$ and the representative component A1$t$ into a first voice spectrum V1'$t$ and a first average spectrum A1'$t$, respectively. For example, the first filter generating unit 106 converts the first voice component V1$t$ and the representative component A1$t$ into the first voice spectrum V1'$t$ and the first average spectrum A1'$t$, respectively, by inverse transform of the transform from the spectrum into the feature at the acquiring unit 101. If spectra themselves are used as features, transform and inverse transform are not necessary.

Subsequently, the first filter generating unit 106 obtains a first filter FV1$ti$ for extracting an i-th element V$ti$ of a voice spectrum V$t$ by the following Equation (1):

$$FV1ti = |V1'ti|^L / (|V1'ti|^L + |A1'ti|^L) \quad (1).$$

The first filter generating unit 106 obtains a first filter FB1$ti$ for extracting an i-th element B$ti$ of an ambient sound spectrum B$t$ by the following Equation (2):

$$FB1ti = |A1'ti|^L / (|V1'ti|^L + |A1'ti|^L) \quad (2).$$

In the equations, L is a parameter and may be set to 2, for example. Since the relation FV1$ti$=1−FB1$ti$ is satisfied, only the first filter (FV1$ti$ or FB1$ti$) of either one of the voice spectrum V$t$ and the ambient sound spectrum B$t$ needs to be obtained.

The first filter generating unit 106 may perform postprocessing such as smoothing along the time axis and smoothing between elements on the first filter. As described above, it is possible to improve the problem that an ambient sound spectrum remains in a voice spectrum by using the representative component estimated by the representative component estimating unit 104 for generating of the filter for extracting the first voice spectrum.

The separating unit 107 extracts the voice spectrum V$t$ and the ambient sound spectrum B$t$ by using the first filter FV1$t$ for the voice spectrum or the first filter FB1$t$ for the ambient sound spectrum. The separating unit 107 first obtains an i-th element V$ti$ of the voice spectrum V$t$ by using the spectrum X$t$ at time t acquired by the acquiring unit 101 by the following Equation (3):

$$Vti = Xti \times FV1ti \quad (3).$$

Subsequently, the separating unit 107 performs inverse Fourier transform on the voice spectrum V$t$ to obtain a voice signal Sv. Note that the amplitude value of samples overlapping between two frames is a sum of values obtained by inverse Fourier transform from the respective frames. An ambient sound signal Sb may be obtained as a difference between an input signal S and the voice signal Sv or may be obtained similarly to the method by which the voice signal is obtained. As a result, the acoustic signal can be separated into the voice signal and the ambient sound signal. That is, a high-purity voice signal in which little ambient sound is mixed can be heard. Furthermore, speech recognition from which the influence of the ambient sound signal is eliminated can be performed by outputting the voice signal resulting from separation to a subsequent speech recognizing unit (not illustrated).

Figure 3B:
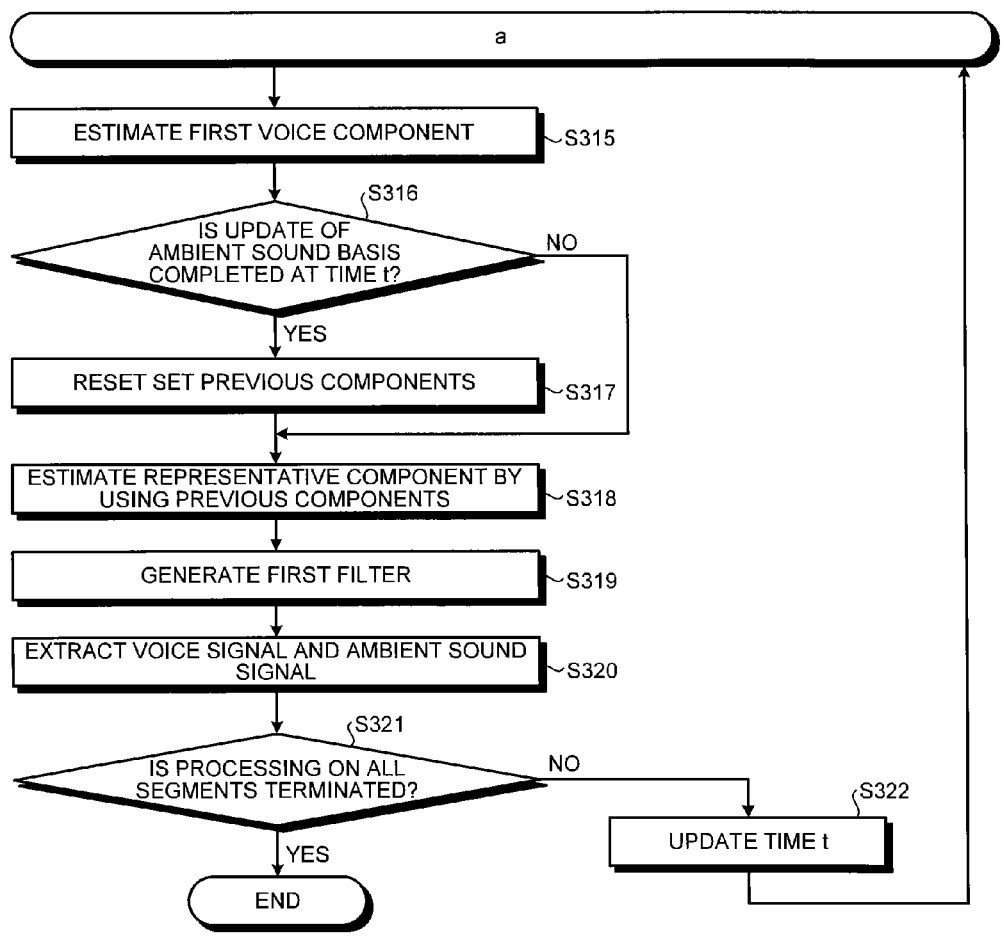

Next, signal processing performed by the signal processing apparatus 100 having such a configuration will be described with reference to FIGS. 3A and 3B. FIGS. 3A and 3B illustrate a flowchart illustrating an example of signal processing in the first embodiment.

First, the acquiring unit 101 sets the time at which an acoustic signal to be analyzed is started to time t=0 (step S301). The acquiring unit 101 sets update time T1 at which update processing of the ambient sound basis matrix H2 is performed (step S302). The acquiring unit 101 analyzes the frequency of the acoustic signal to acquire the spectrum X$t$ and the feature Z$t$ (step S303). For example, the acquiring unit 101 divides the acoustic signal to be analyzed into frames. The acquiring unit 101 then acquires the spectrum X$t$ of samples of a frame relating to time t and the feature Z$t$ converted from the spectrum.

The calculating unit 102 sets initial values of the voice basis matrix H1 and the ambient sound basis matrix H2 (step S304). The calculating unit 102 sets a value of a basis matrix generated from an acoustic signal of a voice separately provided as the initial value of the voice basis matrix H1, for example. The calculating unit 102 may set a value of a basis matrix generated from an acoustic signal of an ambient sound separately provided as the initial value of the ambient sound basis matrix H2 or may set a random value as the initial value of the ambient sound matrix H2.

The calculating unit 102 determines whether or learned features are acquired (step S305). The learned features are features of previous frames for the time period T2. If the learned features are not acquired (step S305: No), the calculating unit 102 sets the feature Z$t$ of the current frame (time t) as the learned feature of the ambient sound basis matrix H2 (step S306).

If the learned features are acquired (step S305: Yes), the calculating unit 102 determines whether or not update of the ambient sound basis matrix H2 is completed (step S307). If the update has been completed (step S307: Yes), the calculating unit 102 determines whether or not time t of the current frame is larger than the update time T1 (step S308).

If time t is larger than the update time T1 (step S308: Yes), the processing proceeds to step S309 so that update of the ambient sound basis matrix H2 can be performed again. In step S309, the calculating unit 102 resets features set as the learned features to be used for update of the ambient sound basis matrix H2 (deletes the learned features) (step S309). After performing step S309, the processing returns to step S306.

If the update has not been completed in step S307 (step S307: No), the calculating unit 102 estimates the ambient sound basis matrix H2 on the basis of an iterative method by using the learned features (step S310).

The calculating unit 102 determines whether or not update of the ambient sound basis matrix H2 is completed (step S311). For example, the calculating unit 102 determines whether or not the number of times the iterative method performed after update of the ambient sound basis matrix H2 is started is applied has reached the number of times R required until completion. If the number of times R has been reached (step S311: Yes), the calculating unit 102 sets the update time t1 at which the update of the ambient sound basis matrix H2 is to be performed to time at which next update is to be performed (step S312).

If it is determined in step S311 that the number of times R has not been reached (step S311: No), after step S306, after step S312, and if it is determined in step S308 that time t is before the update time T1 (step S308: No), the processing proceeds to step S313.

In step S313, the calculating unit 102 derives the coefficient vector U$t$ approximating the feature Z$t$ of the current frame by using the ambient sound basis matrix H2 and the voice basis matrix H1 that is set in step S304 (step S313).

The first ambient sound estimating unit 103 extracts the coefficient vector U$bt$ for the ambient sound basis matrix H2 from the coefficient vector U$t$, and obtains the vector B1$t$ expressed by the product of the ambient sound basis matrix H2 and the coefficient vector U$bt$ as the first ambient sound component (step S314).

The first voice estimating unit 105 extracts the coefficient vector Uvt for the voice basis matrix H1 from the coefficient vector Ut, and obtains the vector V1t expressed by the product of the voice basis matrix H1 and the coefficient vector Uvt as the first voice component (step S315).

The representative component estimating unit 104 determines whether or not update of the ambient sound basis matrix H2 is completed at time t of the current time (step S316). If the update is completed at time t (step S316: Yes), the representative component estimating unit 104 sets the elements of previous components Zp to 0 (step S317). The previous components Zp refer to components constituted by first ambient sound components previously estimated by the first ambient sound estimating unit 103. As a result, previous components are deleted each time the ambient sound basis matrix H2 is replaced (updated), and the previous components become those obtained by using the same ambient sound basis matrix H2.

After step S317 of if the update is not completed at time t in step S316 (step S316: No), the representative component estimating unit 104 obtains the representative component A1t by using the first ambient sound component B1t of the current frame and the previous components Zp (step S318). The representative component estimating unit 104 also sets the obtained representative component A1t as the previous component Zp. The representative component estimating unit 104 obtains the i-th element A1ti of the representative element A1t as the largest value among the i-th element B1ti of the first ambient sound component Bit and the i-th element Zpi of the previous component Zp.

The first filter generating unit 106 generates the first filter (step S319). For example, the first filter generating unit 106 converts the first voice component V1t and the representative component A1t into the first voice spectrum V1't and the first average spectrum A1't, respectively. The first filter generating unit 106 then generates the first filter FV1t for extracting the voice spectrum Vt or the first filter FB1t for extracting the ambient sound spectrum Bt by using the first voice spectrum V1' t and the first average spectrum A1't by Equation (1) or Equation (2) described above.

The separating unit 107 obtains the voice signal Sv and the ambient sound signal Sb by using the first filter FV1t for the voice spectrum or the first filter FB1t for the ambient sound spectrum (step S320).

The separating unit 107 determines whether or not processing has been performed on all the frames (all the segments) of the acoustic signal acquired by the acquiring unit 101 (step S321). If processing has not been performed on all the segments (step S321: No), the separating unit 107 updates time t to time of the next frame (step S322), and the processing returns to step S303. If processing has been performed on all the segments (step S321: Yes), the signal processing is completed.

Figure 4:
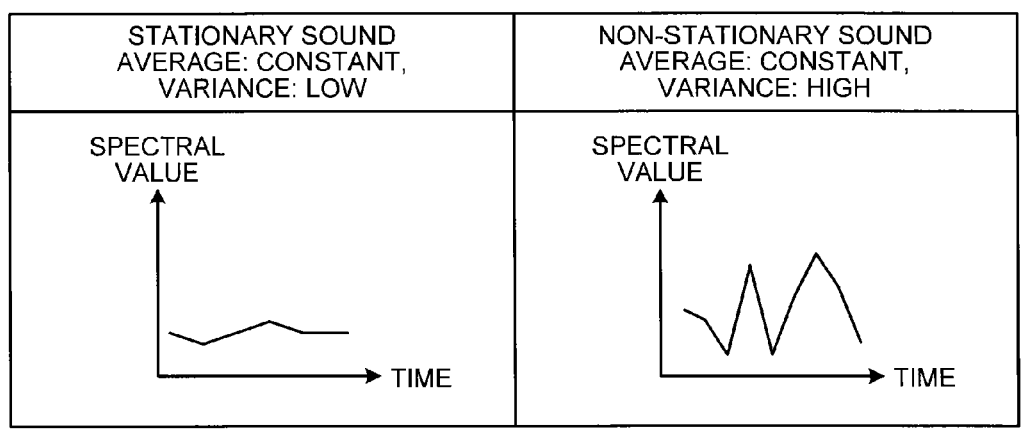
FIG. 4 illustrates graphs of definitions of stationarity and non-stationarity of acoustic signals.

FIG. 4 illustrates graphs of definitions of stationarity and non-stationarity of acoustic signals. Stationary sound (stationary acoustic signal) is sound with constant average and low variance. For example, in the case of voice, a long sound such as [a□] is stationary sound. In the case of ambient sound, a cheer, operating sound of an air conditioner, and the like are stationary sound.

Non-stationary sound (non-stationary acoustic signal) is sound with constant average and high variance. For example, in the case of voice, speaking voice is non-stationary sound. In the case of ambient sound, music and sound at a scene change are non-stationary sound.

Non-stationary sound has a higher variance than stationary sound. Most of voice is classified as non-stationary sound. FIG. 4 illustrates examples of spectral values of stationary sound and non-stationary sound.

Figure 5:
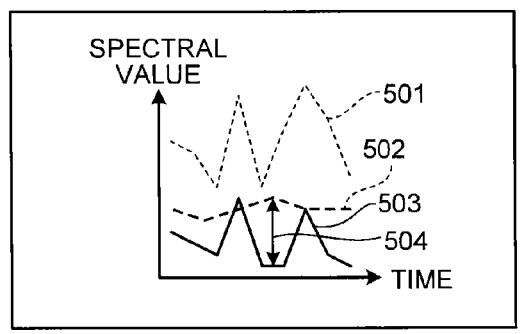
FIG. 5 is a graph explaining an effect of mixed sound separation according to the first embodiment.
Figures 6, 7:
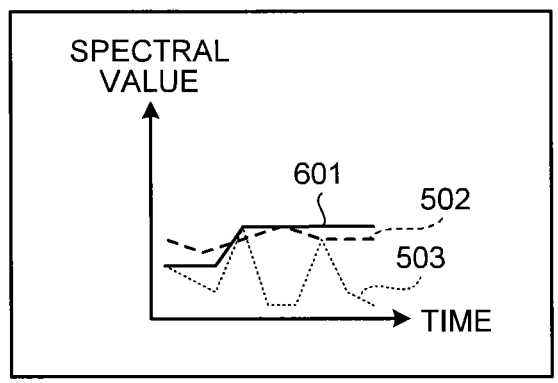
FIG. 6 is a graph explaining an effect of mixed sound separation according to the first embodiment.
FIG. 7 is a table explaining results of an objective evaluation experiment according to the first embodiment.

FIGS. 5 and 6 are graphs for explaining an effect according to the present embodiment when separation is performed on sound in which speaking voice and stationary ambient sound are mixed. FIG. 5 illustrates that an input mixed sound component 501 contains an input ambient sound component 502 and a first ambient sound component 503. If the ambient sound basis matrix H2 is estimated using a small number of samples, the first ambient sound component 503 is insufficient relative to the input ambient sound component 502 at time of a difference 504 indicated by an arrow in FIG. 5, for example. The ambient sound may therefore remain in the voice according to the method using a filter generated by using the first ambient sound component 503, for example.

According to the present embodiment, since a representative component 601 estimated by using previous first ambient sound components is used as illustrated in FIG. 6, it is possible to improve the problem that ambient sound remains in voice.

Figure 8:
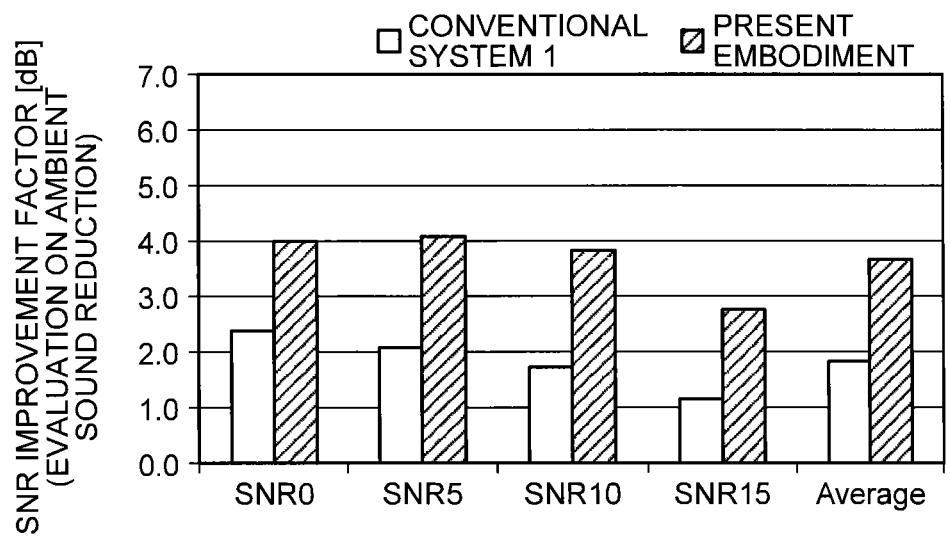
FIG. 8 is a graph explaining the results of the objective evaluation experiment according to the first embodiment.
Figure 9:
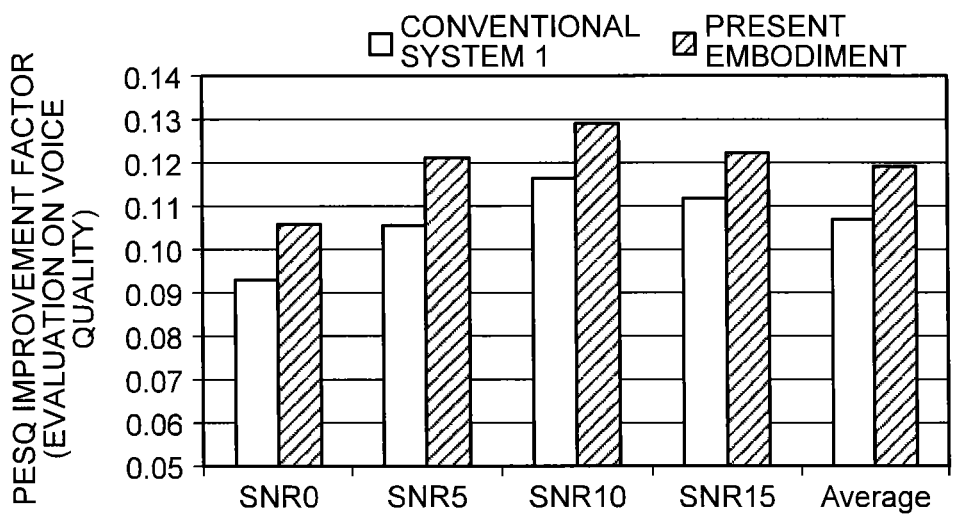
FIG. 9 is a graph explaining the results of the objective evaluation experiment according to the first embodiment.

FIGS. 7 to 9 are a table and graphs for explaining results of an objective evaluation experiment according to the first embodiment. FIG. 7 illustrates an example of information on voice and ambient sound used for the experiment. For example, FIG. 7 shows that four types of sound sources (two films, one animation, one news) are used as voice, and that 20 types of sound sources (five classical music pieces, five instrumentals, five soundtracks and five cheers) are used as ambient sound. A sound of 20 seconds, for example, of each of the sound sources is used.

As illustrated in FIGS. 8 and 9, in the experiment, mixed sound in which ambient sound is mixed in voice under one of four conditions (SNR0, SNR5, SNR10, and SNR15) is used. Then, the mixed sound is separated into a voice signal and an ambient sound signal. The average accuracy of the conditions is illustrated in FIGS. 8 and 9. Note that "conventional system 1" in FIGS. 8 and 9 refers to results of evaluation on voice signals extracted by a filter generated by using the first ambient sound component 503.

FIG. 8 is a graph illustrating results of evaluation based on SNR improvement factors. The SNR improvement factors allow evaluation of the accuracy of ambient sound reduction. An evaluation value may be obtained by a method disclosed in Yukihiro Nomura et al., "Musical Noise Reduction by Spectral Subtraction Using Morphological Process", The Transactions of the Institute of Electronics, Information and Communication Engineers, Vol. J89-D, No. 5, pp. 991-1000, for example.

FIG. 9 is a graph illustrating results of evaluation based on PESQ improvement factors. The PESQ allows evaluation of the degradation level of extracted voice signals. The PESQ may be obtained by a method disclosed in "Perceptual evaluation of speech quality (PESQ), an objective method for end-to-end speech quality assessment of narrowband telephone networks and Speech Codecs", ITUU-T Recommendation P. 862, February 2001, for example. The effect of improvement according to the present embodiment can be confirmed in FIGS. 8 and 9.

As described above, the signal processing apparatus according to the present embodiment extracts the voice signal Sv and the ambient sound signal Sb by using the representative component A1t estimated by using the previous components Zp including the first ambient sound components previously estimated. Accordingly, even the first ambient sound component Bit estimated at time t is insufficient relative to the actual input ambient sound, the insufficiency can be compensated for by using the representative component A1$t$. As a result, the accuracy of extraction of voice signals can be improved.

Second Embodiment

Figure 10:
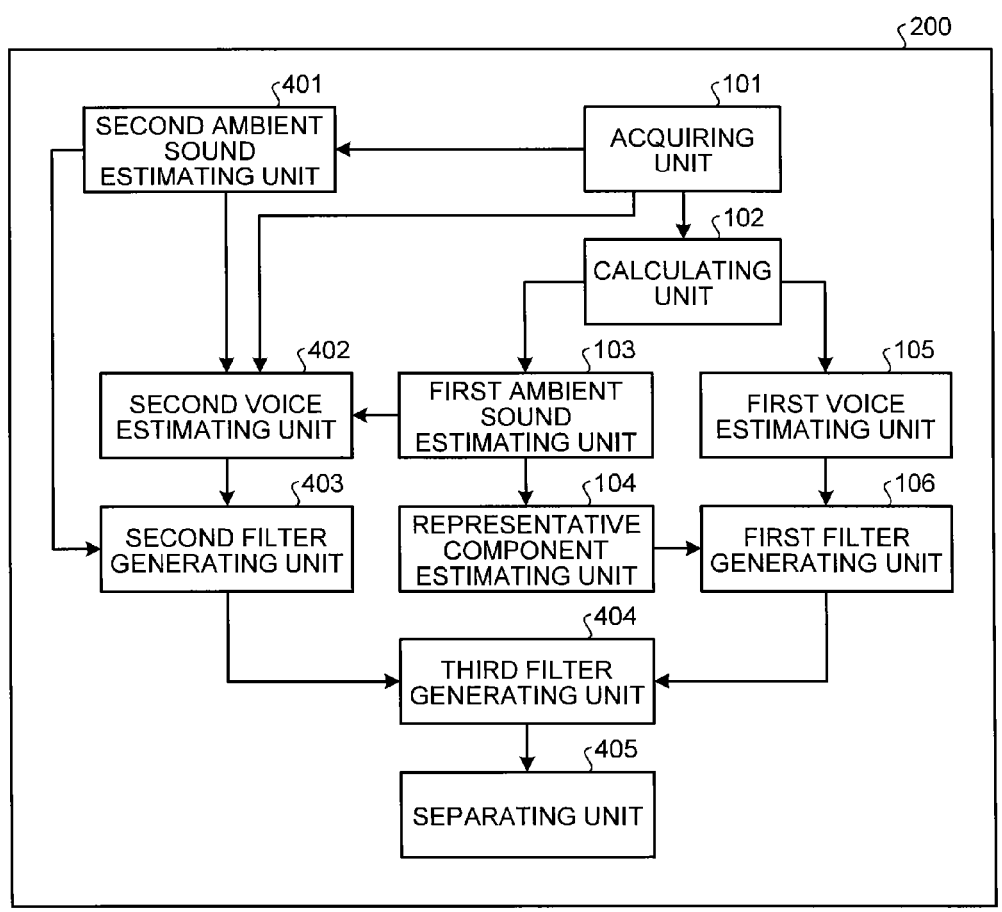
FIG. 10 is a block diagram illustrating a signal processing apparatus according to a second embodiment.

Next, a signal processing apparatus according to the second embodiment will be described. FIG. 10 is a block diagram illustrating an example of a configuration of a signal processing apparatus 200 according to the second embodiment. As illustrated in FIG. 10, the signal processing apparatus 200 includes an acquiring unit 101, a calculating unit 102, a first ambient sound estimating unit 103, a representative component estimating unit 104, a first voice estimating unit 105, a first filter generating unit 106, a second ambient sound estimating unit 401, a second voice estimating unit 402, a second filter generating unit 403, a third filter generating unit 404 and a separating unit 405.

The second embodiment is different from the first embodiment in that the second ambient sound estimating unit 401, the second voice estimating unit 402, the second filter generating unit 403 and the third filter generating unit 404 are additionally provided and in the functions of the separating unit 405. The other components and functions are the same as those in FIG. 1 that is a block diagram of the signal processing apparatus 100 according to the first embodiment and will therefore be designated by the same reference numerals and the description thereof will not be repeated.

The second ambient sound estimating unit 401 estimates a second ambient sound component that is stationary from the feature acquired by the acquiring unit 101. The second voice estimating unit 402 estimates a second voice component from the first ambient sound component estimated by the first ambient sound estimating unit 103 and the second ambient sound component. The second filter generating unit 403 generates a second filter for extracting a voice spectrum or an ambient sound spectrum from the second ambient sound component and the second voice component. The third filter generating unit 404 generates a third filter integrating the first filter and the second filter.

The separating unit 405 separates the acoustic signal into the voice signal and the ambient sound signal by using the third filter and the acoustic signal spectrum.

Since hardware of the signal processing apparatus 200 according to the present embodiment is the same as that in FIG. 2 illustrating the hardware configuration of the signal processing apparatus 100 according to the first embodiment, the description thereof will not be repeated. Details of the components of the signal processing apparatus 200 according to the present embodiment will further be described below.

The second ambient sound estimating unit 401 estimates a second ambient sound component B2 by using the features of a plurality of previous frames acquired by the acquiring unit 101. Specifically, the second ambient sound estimating unit 401 obtains an average value (average feature) of the features of a plurality of previous frames as the second ambient sound component B2. Note that the learned features used for updating the ambient sound basis matrix H2 by the calculating unit 102 can be used as the features used for obtaining the second ambient sound component B2.

The second voice estimating unit 402 estimates a second voice component V2$t$ by using the feature Zt of the current frame acquired by the acquiring unit 101, the first ambient sound component B1$t$ estimated by the first ambient sound estimating unit 103, and the second ambient sound component B2. For example, the second voice estimating unit 402 obtains a component resulting from subtracting the largest value among the first ambient sound component B1$t$ and the second ambient sound component B2 from the feature Zt as the second voice component V2$t$. In this case, the i-th element V2$ti$ of the second voice component V2$t$ is Zti−max(B1$ti$, B2$i$).

Here, B1$ti$ is the i-th element of the first ambient sound component B1 and B2$i$ is the i-th element of the second ambient sound component B2. In addition, max(a, b) is a function for obtaining the largest value among a value of a and a value of b. Since both the first ambient sound expressing a non-stationary component and the second ambient sound expressing a stationary component are used, it is possible to estimate the voice component while reducing the ambient sound with high accuracy whether the sound is stationary or non-stationary (refer to the second filter effect in FIG. 14 to be described later).

The second filter generating unit 403 generates a filter (second filter) for extracting a voice spectrum Vt or an ambient sound spectrum Bt by using the second voice component V2$t$ estimated by the second voice estimating unit 402 and the second ambient sound component B2 estimated by the second ambient sound estimating unit 401. The second filter generating unit 403 first converts the second voice component V2$t$ and the second ambient sound component B2 into a second voice spectrum V2' and a second ambient sound spectrum B2', respectively. For example, the second filter generating unit 403 converts the second voice component V2$t$ and the second ambient sound component B2 into the second voice spectrum V2' and the second ambient sound spectrum B2', respectively, by inverse transform of the transform from the spectrum into the feature at the acquiring unit 101.

Subsequently, the second filter generating unit 403 obtains a second filter FV2$ti$ for extracting an i-th element Vti of the voice spectrum Vt by the following Equation (4):

$$FV2ti = |V2'ti|^L / (|V2'ti|^L + |B2'i|^L) \qquad (4).$$

The second filter generating unit 403 also obtains a second filter FB2$ti$ for extracting an i-th element Bti of the ambient sound spectrum Bt by the following Equation (5). In the equations, L is a parameter and may be set similarly to that in the first filter generating unit 106.

$$FB2ti = |B2'i|^L / (|V2'ti|^L + |B2'i|^L) \qquad (5).$$

The third filter generating unit 404 generates a filter for extracting the voice spectrum Vt or the ambient sound spectrum Bt by using the first filter generated by the first filter generating unit 106 and the second filter generated by the second filter generating unit 403. For example, the third filter generating unit 404 obtains a third filter FV3$ti$ for extracting the i-th element Vti of the voice spectrum Vt by the following Equation (6):

$$FV3ti = \alpha \times FV1ti + (1-\alpha) \times FV2ti \qquad (6).$$

In the equation, $\alpha$ is a blending ratio. $\alpha$ may be set to an arbitrary value in a range of $0 \leq \alpha \leq 1$ such as 0.1. In this manner, the third filter generating unit 404 generates the third filter by a weighted sum of the first filter and the second filter using $\alpha$ as a weight. Note that the method for generating the third filter is not limited thereto.

The third filter generating unit 404 also obtains a third filter FB3$ti$ for extracting the i-th element Bti of the ambient sound spectrum Bt by the following Equation (7) or (8):

$$FB3ti = \alpha \times FB1ti + (1-\alpha) \times FB2ti \qquad (7)$$

$$FB3ti = 1 - FV3ti \qquad (8).$$

The third filter generating unit 404 may calculate element values of the third filter by using the element values used for generating the first filter and the second filter. For example, the third filter generating unit 404 may obtain the third filter $FV3ti$ by the following Equation (11) by using a variable $V3ti$ expressed by the following Equation (9) and a variable $B3ti$ expressed by the following Equation (10):

$$V3ti = \alpha \times |V1'ti|'L + (1-\alpha) \times |V2'ti|'L \quad (9)$$

$$B3ti = \alpha \times |B1'ti|'L + (1-\alpha) \cdot \times |B2'i|'L \quad (10)$$

$$FV3ti = |V3ti|'L/(|V3ti|'L + |B3ti|'L) \quad (11).$$

Voice is more non-stationary than ambient sound, and therefore the first filter generated by estimating the non-stationary component of voice is better in extracting the voice component than the second filter. Accordingly, the third filter can take advantages of the characteristics of the first filter that is better in extracting the voice component and the characteristics of the second filter that is highly accurate in reducing the ambient sound, which allows separation with higher accuracy (refer to the third filter effect in FIG. 14, and FIGS. 15 and 16 to be described later).

The separating unit 405 extracts the voice spectrum Vt and the ambient sound spectrum Bt by using the third filter $FV3t$ for the voice spectrum or the third filter $FB3t$ for the ambient sound spectrum generated by the third filter generating unit 404. The separating unit 405 first obtains the i-th element Vti of the voice spectrum Vt by using the spectrum Xt at time t acquired by the acquiring unit 101 by the following Equation (12):

$$Vti = Xti \times FV1ti \quad (12).$$

Subsequently, the separating unit 405 performs inverse Fourier transform on the voice spectrum Vt to obtain the voice signal Sv. As a result, the acoustic signal can be separated into the voice signal and the ambient sound signal. That is, a high-purity voice signal in which little ambient sound is mixed can be heard.

Figure 11A:
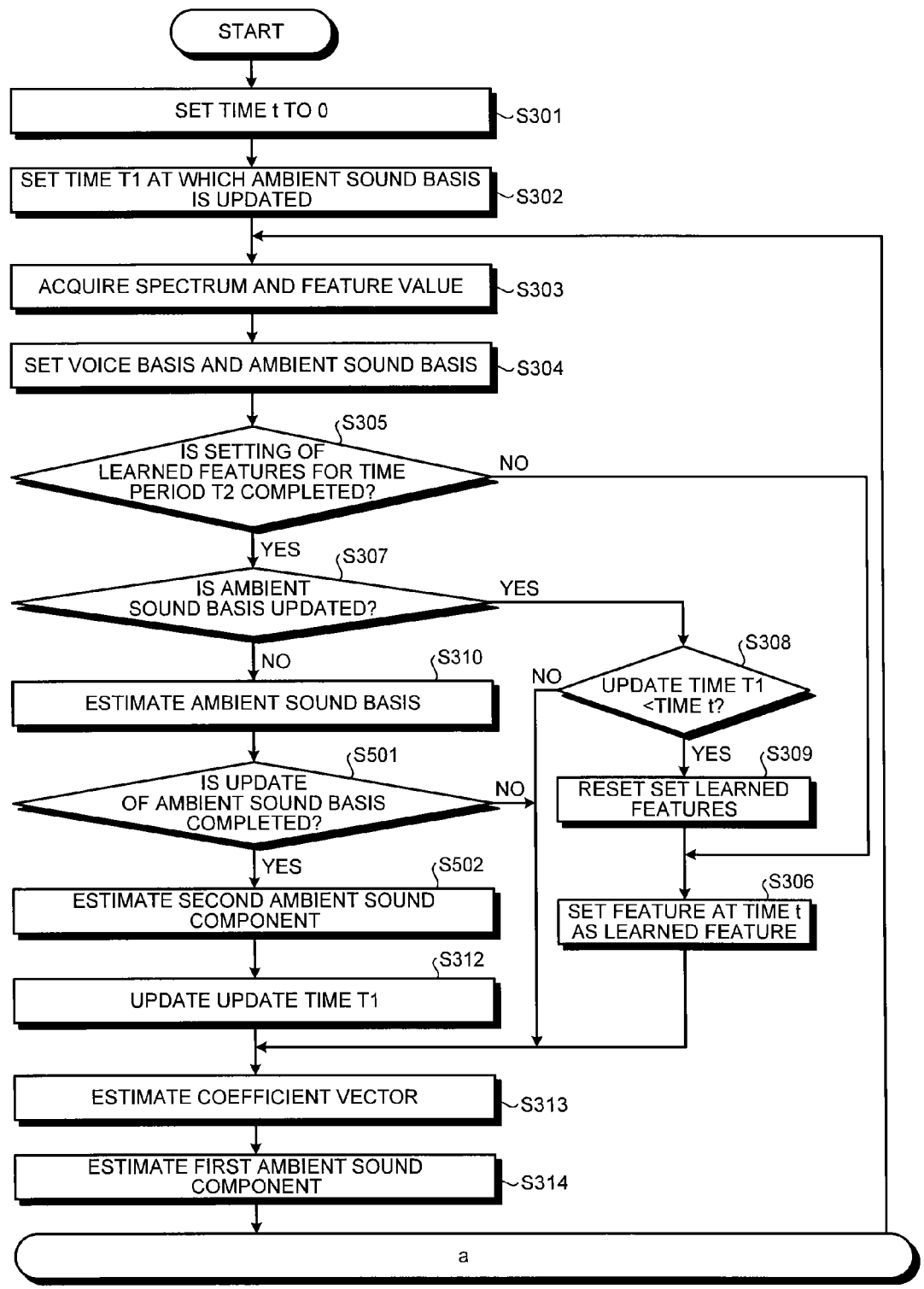
FIGS. 11A and 11B illustrate a flowchart of signal processing in the second embodiment.
Figure 11B:
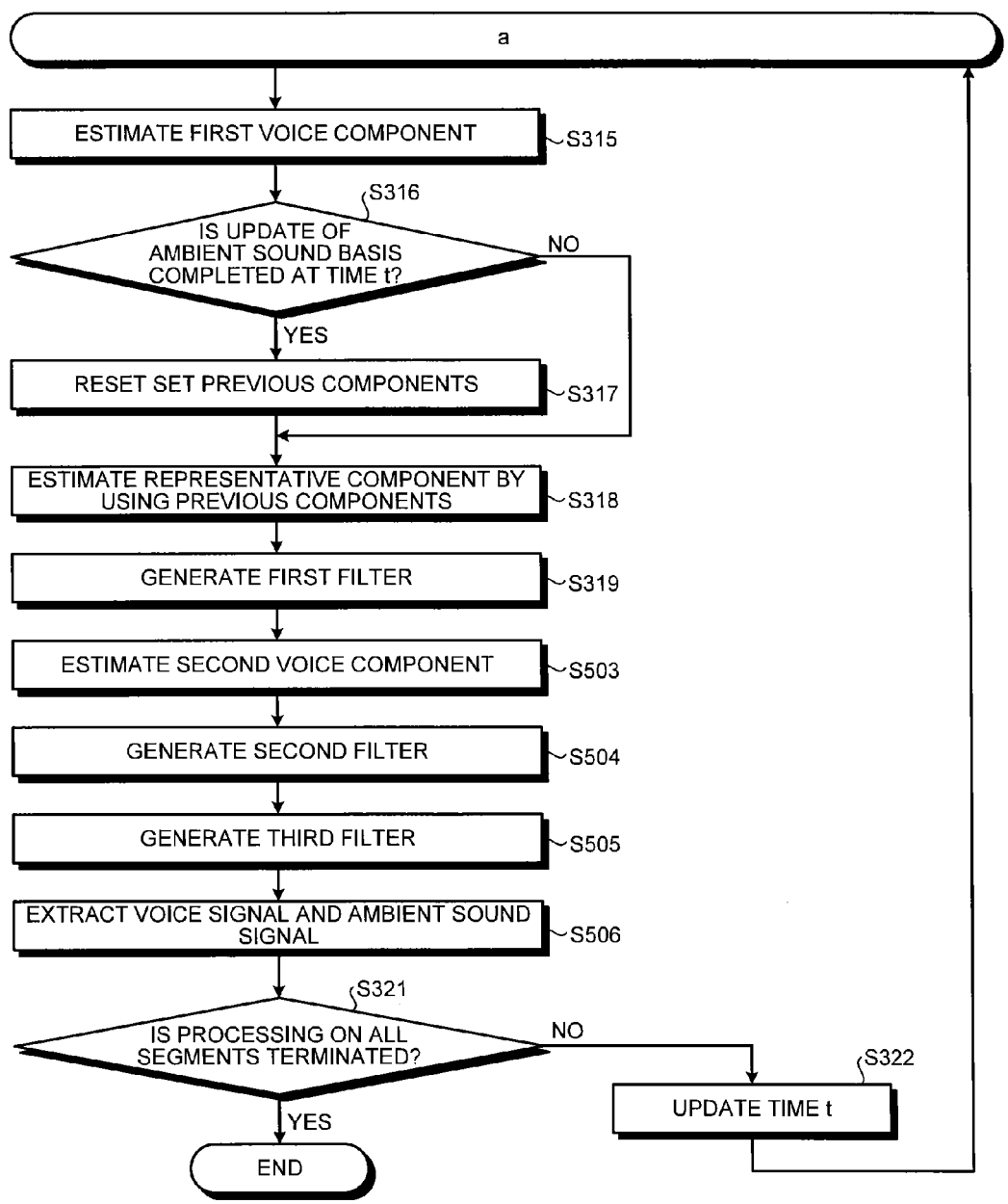

Next, signal processing performed by the signal processing apparatus 200 having such a configuration will be described with reference to FIGS. 11A and 11B. FIGS. 11A and 11B illustrate a flowchart illustrating an example of signal processing in the second embodiment.

Since steps S301 to S310 are the same as steps S301 to S310 in the flowchart of FIG. 3A of the first embodiment, the steps will be designated by the same reference numerals and the description thereof will not be repeated.

After step S310, the calculating unit 102 determines whether or not the number of times the iterative method performed after update of the ambient sound basis matrix H2 is started is applied has reached the number of times R required until completion (step S501). If the number of times R has not been reached (step S501: No), the processing proceeds to step S313. If the number of times R has been reached (step S501: Yes), the processing proceeds to step S502.

In step S502, the second ambient sound estimating unit 401 obtains an average feature that is an average value of the learned features used for update of the ambient sound basis matrix H2 as the second ambient sound component B2 (step S502). After step S502, the processing proceeds to step S312.

Since subsequent steps S312 to S319 are the same as steps S312 to S319 in the flowchart of FIGS. 3A and 3B of the first embodiment, the steps will be designated by the same reference numerals and the description thereof will not be repeated.

After step S319, the second voice estimating unit 402 obtains the second voice component V2t by subtracting the largest component among the first ambient sound component B1t and the second ambient sound component B2 from the acquired feature Zt of the current frame (step S503).

The second filter generating unit 403 generates the second filter (step S504). For example, the second filter generating unit 403 first converts the second voice component V2t and the second ambient sound component B2 into the second voice spectrum V2' and the second ambient sound spectrum B2', respectively. The second filter generating unit 403 then generates the second filter FV2t for extracting the voice spectrum Vt or the second filter FB2t for extracting the ambient sound spectrum Bt by Equation (4) or (5) described above by using the second voice spectrum V2't and the second ambient sound spectrum B2't resulting from the conversion.

The third filter generating unit 404 integrates the first filter and the second filter on the basis of the parameter α to generate the third filter FV3t for extracting the voice spectrum Vt or the third filter FB3t for extracting the ambient sound spectrum Bt (step S505).

The separating unit 405 obtains the voice signal Sy and the ambient sound signal Sb by using the third filter FV3t for the voice spectrum or the third filter FB3t for the ambient sound spectrum (step S506).

Since subsequent steps S321 to S322 are the same as steps S321 to S322 in the flowchart of FIG. 3B of the first embodiment, the steps will be designated by the same reference numerals and the description thereof will not be repeated.

Figure 12:
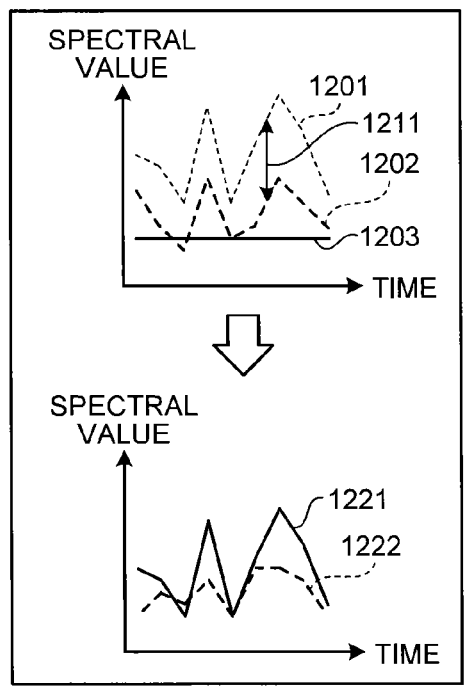
FIG. 12 illustrates graphs explaining an effect of mixed sound separation according to the second embodiment.
Figure 13:
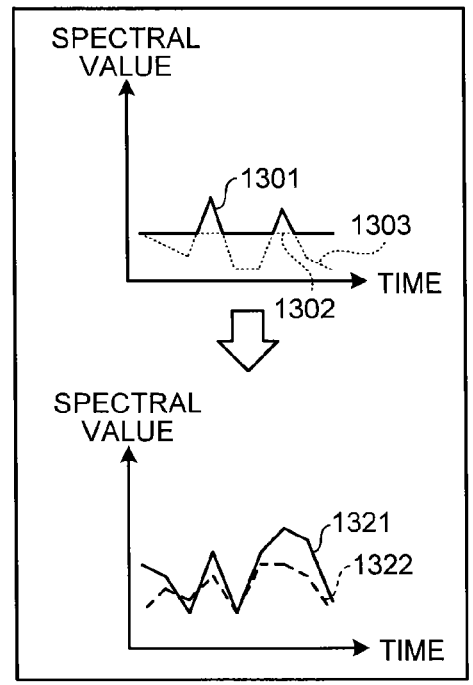
FIG. 13 illustrates graphs explaining an effect of mixed sound separation according to the second embodiment.
Figure 14:
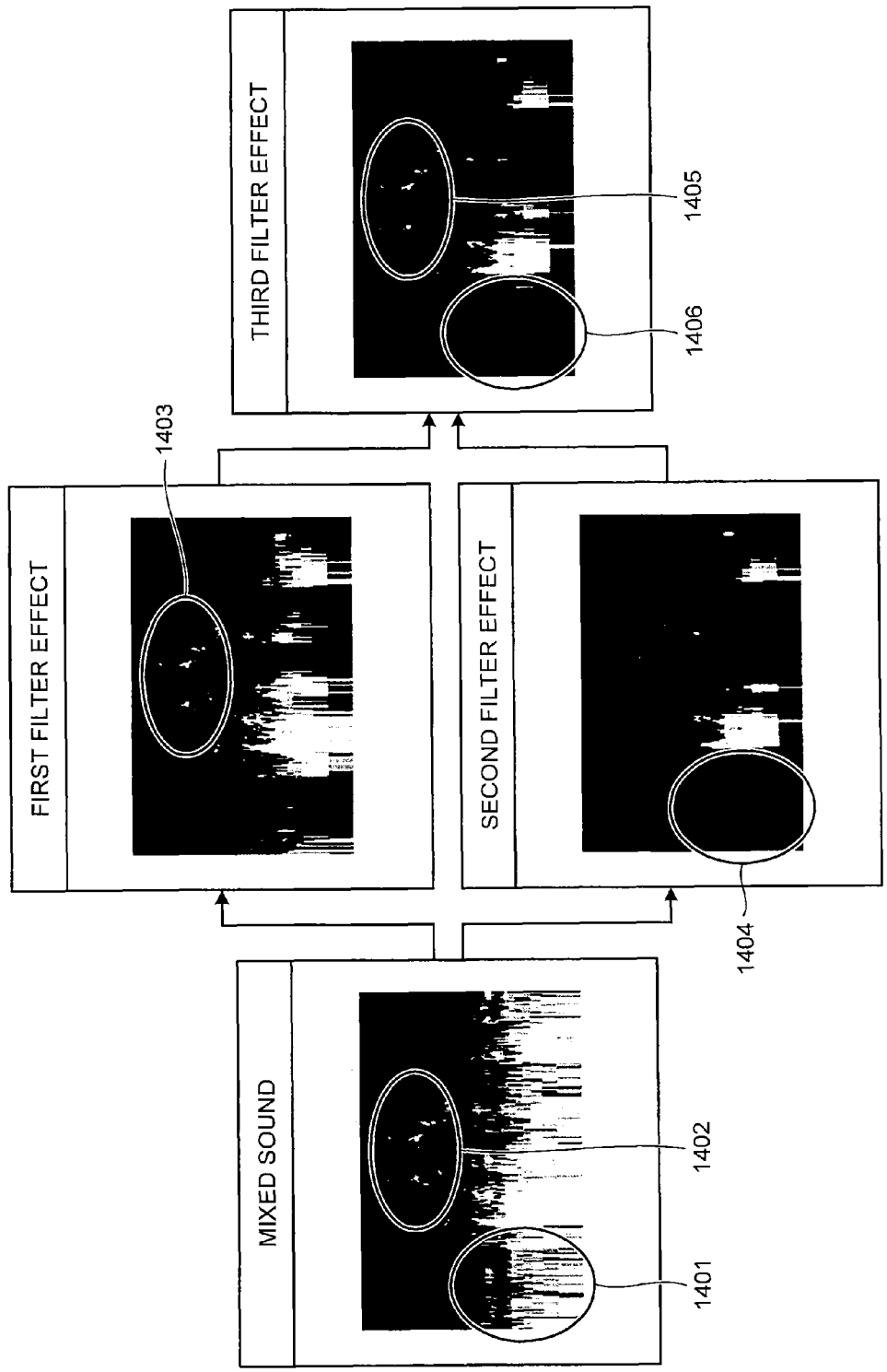
FIG. 14 is a diagram explaining an effect of mixed sound separation according to the second embodiment.

FIGS. 12 to 14 are graphs and a diagram for explaining an effect according to the present embodiment when separation is performed on sound in which speaking voice and non-stationary ambient sound are mixed. FIG. 12 illustrates an example of spectral values of an input mixed sound component 1201, an input ambient sound component 1202, and a second ambient sound component 1203. The difference between the input mixed sound component 1201 and the input ambient sound component 1202 is an input voice component 1211.

With the second ambient sound component 1203 that is an average spectrum of the learned features, the non-stationary component of the input ambient sound cannot be taken into account. The ambient sound may thus remain in a voice component 1221 estimated with the difference between the mixed sound and the ambient sound (second ambient sound component 1203). The lower part of FIG. 12 illustrates an example of spectral values of an input voice component 1222 and the estimated voice component 1221. As in this example, the difference between the input voice component 1222 and the estimated voice component 1221 is large (the ambient sound remains therein) when the second ambient sound component 1203 is used.

In contrast, in the present embodiment, an ambient sound component 1301 obtained by processing for estimating the second voice component is used as illustrated in FIG. 13. For example, the largest value among the second ambient sound component 1302 and the first ambient sound component 1303 is used as the ambient sound component 1301. The lower part of FIG. 13 illustrates an example of spectral values of an input voice component 1322 and an estimated second voice component 1321. As in this example, according to the present embodiment, the difference between the input voice component 1322 and the estimated second voice component 1321 can be made smaller. That is, reduction of the ambient sound also taking the non-stationarity (first ambient sound component) into account can be realized.

FIG. 14 is a diagram illustrating results of separating mixed sound by using each of the first filter, the second filter, and the third filter. The mixed sound contains a spectrum 1401 corresponding to ambient sound and a spectrum 1402 corresponding to voice. It is desirable that the spectrum 1401 corresponding to the ambient sound be reduced and that the spectrum 1402 corresponding to the voice be lost as little as possible.

When only the first filter is used, loss of voice is small (spectrum 1403) but the effect of reducing the spectrum corresponding to the ambient sound is relatively small. When only the second filter is used, the effect of reducing the spectrum 1404 corresponding to the ambient sound is relatively large. When the third filter taking both the filters into account is used, the loss of voice is small (spectrum 1405) and the effect of reducing the spectrum 1406 corresponding to the ambient sound can also be made larger.

Figure 15:
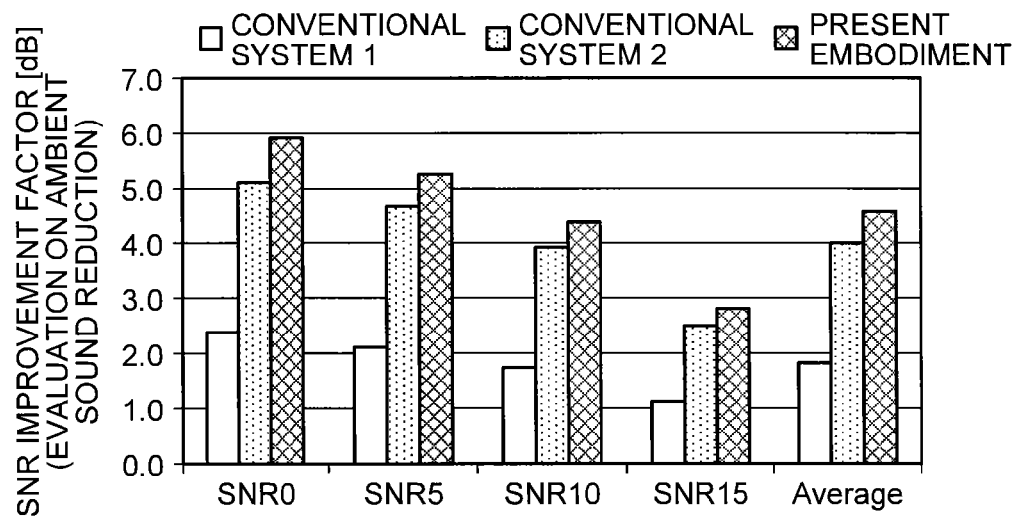
FIG. 15 is a graph explaining results of an objective evaluation experiment according to the second embodiment.
Figure 16:
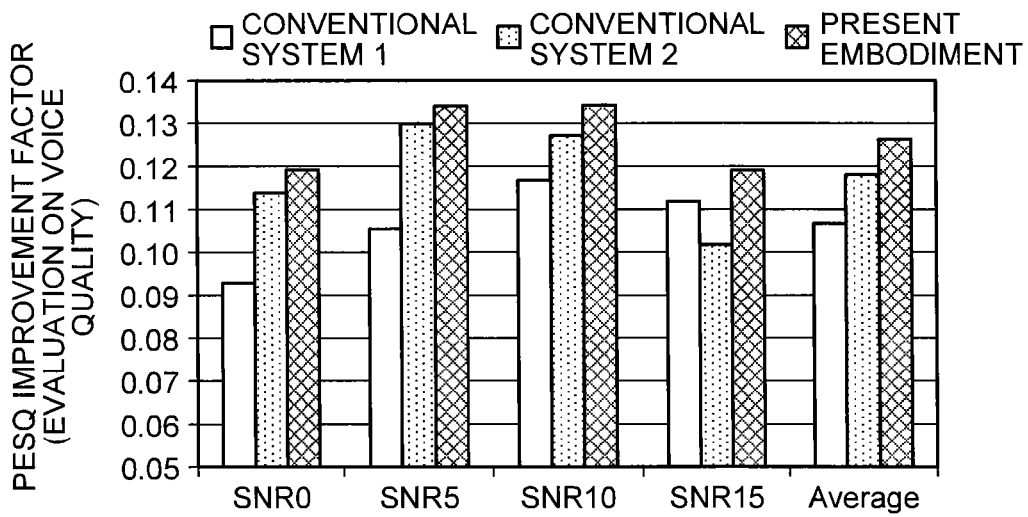
FIG. 16 is a graph explaining the results of the objective evaluation experiment according to the second embodiment.

FIGS. 15 and 16 are graphs for explaining results of an objective evaluation experiment according to the second embodiment. The voice, the ambient sound and the mixed sound used in the experiment of FIGS. 15 and 16 are the same as those used in the objective evaluation experiment of FIGS. 8 and 9 (FIG. 7). FIG. 15 is a graph illustrating results of evaluation based on SNR improvement factors. FIG. 16 is a graph illustrating results of evaluation based on PESQ improvement factors. The effect of improvement according to the present embodiment can be confirmed in FIGS. 15 and 16. Note that "conventional system 2" in FIGS. 15 and 16 refers to results of evaluation on voice signals obtained by estimation from the difference between the mixed sound and the second ambient sound component as expressed by 1221 in FIG. 12.

As described above, with the signal processing apparatus according to the second embodiment, an acoustic signal can be separated by taking both of stationary ambient sound and non-stationary ambient sound into account.

Third Embodiment

Figure 17:
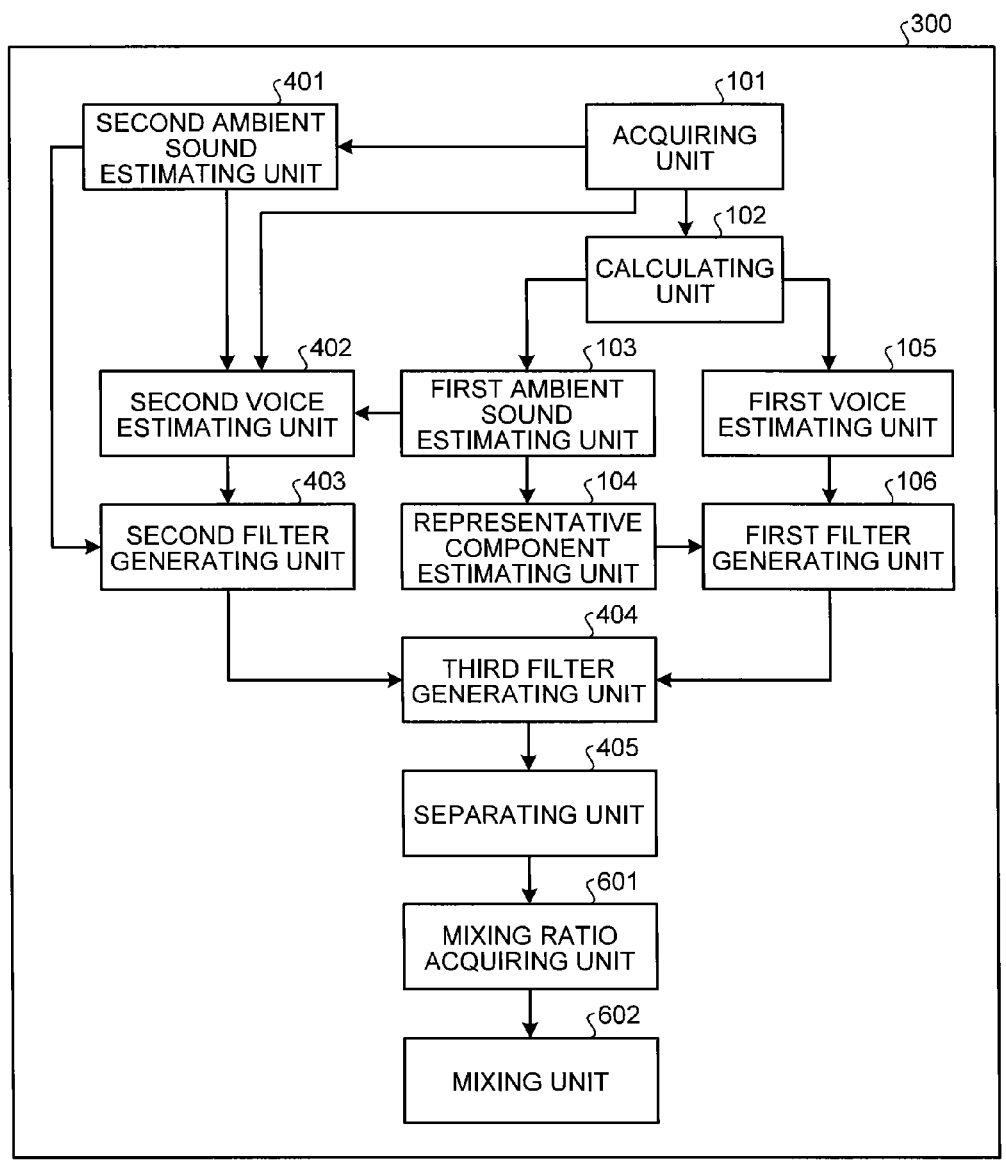
FIG. 17 is a block diagram illustrating a signal processing apparatus according to a third embodiment.

Next, a signal processing apparatus according to the third embodiment will be described. FIG. 17 is a block diagram illustrating an example of a configuration of a signal processing apparatus 300 according to the third embodiment. As illustrated in FIG. 17, the signal processing apparatus 300 includes an acquiring unit 101, a calculating unit 102, a first ambient sound estimating unit 103, a representative component estimating unit 104, a first voice estimating unit 105, a first filter generating unit 106, a second ambient sound estimating unit 401, a second voice estimating unit 402, a second filter generating unit 403, a third filter generating unit 404, a separating unit 405, a mixing ratio acquiring unit 601, and a mixing unit 602.

The third embodiment is different from the second embodiment in that the mixing ratio acquiring unit 601 and the mixing unit 602 are additionally provided. The other components and functions are the same as those in FIG. 10 that is a block diagram of the signal processing apparatus 200 according to the second embodiment and will therefore be designated by the same reference numerals and the description thereof will not be repeated.

The mixing ratio acquiring unit 601 acquires the mixing ratio of the voice signal and the ambient sound signal from the separating unit 405 or an external input. The mixing ratio acquiring unit 601 acquires the mixing ratio on the basis of features newly extracted from the signals obtained by the separating unit 405.

For example, the mixing ratio acquiring unit 601 can set and acquire the mixing ratio so that the average value of power obtained as a square of amplitude of the voice signal is larger than that of the ambient sound signal. Alternatively, the mixing ratio acquiring unit 601 may set and acquire the mixing ratio so that the voice signal or the ambient signal is further enhanced according to the intensity of the power or the feature obtained by frequency analysis. Still alternatively, the mixing ratio acquiring unit 601 may acquire a mixing ratio set by the user as an external input.

The mixing unit 602 mixes the voice signal and the ambient sound signal obtained by the separation by the separating unit 405 according to the mixing ratio acquired by the mixing ratio acquiring unit 601 to generate a mixed signal (mixed sound).

In this manner, it is possible to set the mixing ratio of the ambient sound higher relative to voice commenting on sports so that the atmosphere of the venue can be enjoyed by mixing the voice signal and the ambient sound signal according to the acquired mixing ratio. Furthermore, it is possible to provide sound in which the characteristic of a content is enhanced in such a manner that the voice is enhanced in a drama or that the ambient sound is enhanced in music by controlling the mixing ratio of the voice and that of the ambient sound according to the genre of the content. Furthermore, it is also possible to meet discontent of a user that the voice is hard to hear by setting the mixing ratio of the ambient sound lower and the mixing ratio of the voice higher. In this manner, it is possible to suit individual tastes.

As described above, according to the first to third embodiments, it is possible to improve the performance of separation into voice and ambient sound.

Programs to be executed by the signal processing apparatus according to the first to third embodiments are embedded in advance in the storage unit 202 or the like and provided therefrom.

Alternatively, the programs to be executed by the signal processing apparatus according to the first to third embodiments may be recorded on a computer readable storage medium such as a compact disk read only memory (CD-ROM), a flexible disk (FD), a compact disk recordable (CD-R), and a digital versatile disk (DVD) in a form of a file that can be installed or executed, and provided as a computer program product.

Still alternatively, the programs to be executed by the signal processing apparatus according to the first to third embodiments may be stored on a computer system connected to a network such as the Internet, and provided by being downloaded via the network. Still alternatively, the programs to be executed by the signal processing apparatus according to the first to third embodiments may be provided or distributed through a network such as the Internet.

The programs to be executed by the signal processing apparatus according to the first to third embodiments can make a computer function as the respective units of the signal processing apparatus described above. In the computer, a CPU can read out the programs from the computer readable storage medium onto a main storage device and execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus comprising:
    acquiring circuitry configured to acquire first feature vectors of an acoustic signal by analyzing a frequency of the acoustic signal, wherein the acoustic signal is inputted through a microphone;
    first ambient sound estimating circuitry configured to estimate, from the first feature vectors, one or more first ambient sound component vectors, each of the first feature vectors is acquired within one of a plurality of first time periods, each of the first ambient sound component vectors being non-stationary among ambient sound component vectors and corresponding to one of the first feature vectors;
    representative component estimating circuitry configured to estimate a representative component vector that is representative of the first ambient sound component vectors, an element of the representative component vector being obtained on the basis of a largest value of corresponding elements among the first ambient sound component vectors;
    first voice estimating circuitry configured to estimate, from one of the first feature vectors, a first voice component vector that is a voice component vector corresponding to one of the first feature vectors;
    first filter generating circuitry configured to generate a first filter, for extracting a second voice component vector and a second ambient sound component vector from further acoustic signal, on the basis of the first voice component vector and the representative component vector; and
    separating circuitry configured to separate the further acoustic signal into a voice signal and an ambient sound signal by using the first filter.

2. The apparatus according to claim 1, further comprising:
    second ambient sound estimating circuitry configured to estimate, from one of the first feature vectors, a third ambient sound component vector that is stationary among ambient sound component vectors and that corresponds to one of the first feature vectors;
    second voice estimating circuitry configured to estimate a third voice component vector by using the first feature vectors, the first ambient sound component vectors, and the third ambient sound component vector, the third voice component vector being a voice component vector corresponding to one of the first feature vectors;
    second filter generating circuitry configured to generate a second filter for extracting a fourth voice component vector and a fourth ambient sound component vector from the further acoustic signal on the basis of the third voice component vector and the third ambient sound component vector; and
    third filter generating circuitry configured to generate a third filter into which the first filter and the second filter are integrated, wherein
    the separating circuitry separates the further acoustic signal into a voice signal and an ambient sound signal by using the third filter.

3. The apparatus according to claim 2, further comprising:
    mixing ratio acquiring circuitry configured to acquire a mixing ratio of the voice signal to the ambient sound signal resulted from the separation; and
    mixing circuitry configured to generate a mixed sound in which the voice signal and the ambient sound signal are mixed according to the mixing ratio.

4. The apparatus according to claim 2, wherein the second ambient sound estimating circuitry is configured to estimate an average value of corresponding elements among the first feature vectors as a corresponding element in the third ambient sound component vector.

5. The apparatus according to claim 2, wherein the second voice estimating circuitry is configured to estimate a value as an element of the third voice component vector, the value being obtained by subtracting a largest value of corresponding elements among the first ambient sound component vectors and a corresponding element of the third ambient sound component vector from a corresponding element to one of the first feature vectors.

6. The apparatus according to claim 2, wherein the third filter generating circuitry is configured to generate the third filter as a weighted sum of the first filter and the second filter.

7. The apparatus according to claim 1, further comprising calculating circuitry configured to calculate an ambient sound basis matrix expressing ambient sound by non-negative matrix factorization by using the first feature vectors, wherein
    the first ambient sound estimating circuitry is configured to estimate the first ambient sound component vectors by using a voice basis matrix expressing voice and the ambient sound basis matrix.

8. The apparatus according to claim 1, wherein the representative component estimating circuitry estimates a largest value of corresponding elements among the first ambient sound component vectors as the element of the representative component vector.

9. The apparatus according to claim 1, further comprising calculating circuitry configured to calculate an ambient sound basis matrix expressing ambient sound by non-negative matrix factorization by using the first feature vectors, wherein
    the first voice estimating circuitry is configured to estimate the first voice component vector by using a voice basis matrix expressing voice and the ambient sound basis matrix.

10. A signal processing method comprising:
    inputting an acoustic signal through a microphone;
    acquiring first feature vectors of the acoustic signal by analyzing a frequency of the acoustic signal;
    estimating, from the first feature vectors, one or more first ambient sound component vectors, each of the first feature vectors being acquired within one of a plurality of first time periods, each of the first ambient sound component vectors being non-stationary among ambient sound component vectors and corresponding to one of the first feature vectors;
    estimating a representative component vector that is representative of the first ambient sound component vectors, an element of the representative component vector being obtained on the basis of a largest value of corresponding elements among the first ambient sound component vectors;
    estimating, from the first feature vectors, a first voice component vector that is a voice component vector corresponding to one of the first feature vectors;

generating a first filter, for extracting a second voice component vector and a second ambient sound component vector from a further acoustic signal, on the basis of the first voice component vector and the representative component vector; and separating the further acoustic signal into a voice signal and an ambient sound signal by using the first filter.

11. A computer program product comprising a non-transitory computer-readable medium containing a program executed by a computer, wherein an acoustic is input through a microphone, the program causing the computer to execute:

acquiring first feature vectors of the acoustic signal by analyzing a frequency of the acoustic signal;

estimating, from first feature vectors, one or more first ambient sound component vectors, each of the first feature vectors being acquired within one of a plurality of first time periods, each of the first ambient sound component vectors being non-stationary among ambient sound component vectors and corresponding to one of the first feature vectors;

estimating a representative component vector that is representative of the first ambient sound component vectors, an element of the representative component vector being obtained on the basis of a largest value of corresponding elements among the first ambient sound component vectors;

estimating, from the first feature vectors, a first voice component vector that is a voice component vector corresponding to one of the first feature vectors;

generating a first filter, for extracting a second voice component vector and a second ambient sound component vector from a further acoustic signal, on the basis of the first voice component vector and the representative component vector; and separating the further acoustic signal into a voice signal and an ambient sound signal by using the first filter.

* * * * *